No. 708,504. Patented Sept. 2, 1902.
H. L. SULMAN & H. F. KIRKPATRICK-PICARD.
TREATMENT OF ORE SLIMES.
(Application filed Mar. 11, 1902.)
(No Model.)
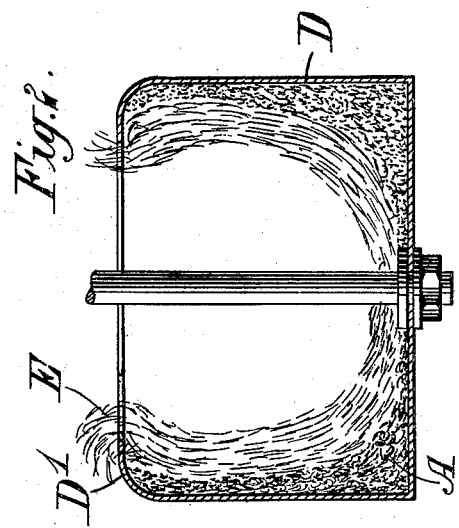
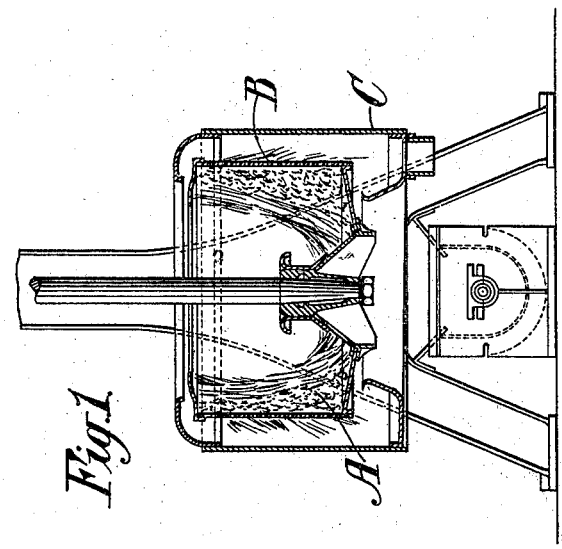

UNITED STATES PATENT OFFICE.

HENRY LIVINGSTONE SULMAN AND HUGH FITZALIS KIRKPATRICK-PICARD, OF LONDON, ENGLAND.

TREATMENT OF ORE-SLIMES.

SPECIFICATION forming part of Letters Patent No. 708,504, dated September 2, 1902.

Application filed March 11, 1902. Serial No. 97,761. (No specimens.)

*To all whom it may concern:*

Be it known that we, HENRY LIVINGSTONE SULMAN and HUGH FITZALIS KIRKPATRICK-PICARD, subjects of the King of England, and residents of London, England, have invented certain new and useful Improvements in or Relating to the Treatment of Ore-Slimes, (for which we have made application for Letters Patent in Great Britain under No. 7,157, dated April 4, 1901,) of which the following is a specification.

This invention has for its object the collection and subsequent treatment of the finely-divided particles of ore known as "slimes," resulting from the crushing of mineral-bearing rocks in batteries or mills, and has special reference to the treatment of slimes containing such valuable contents as may be capable of extraction by solvents. Instead of collecting such slimes from the milling-waters, in which they are suspended if wet-crushed, or from a mixture of dry-crushed slimes with water, by subsidence in depositing-vats, spitzkasten, &c., and treating such resulting deposits by decantation, filter-pressing, &c., we employ centrifugal machines for both collection and treatment. The pulps from stamps, ball-mills, or other reduction machinery are first permitted to deposit any coarse crushed material (or sands) they may contain, but no slimes. As much water is removed as is possible without loss of values by settlement in pointed boxes and the like, and the whole of the resulting liquors which contain these slimes are then passed directly and continuously into a centrifugal machine. This may be constructed with either an open or closed basket—*i. e.*, one in which the sides are either imperforate or perforate—and provided internally with a filtering-surface, such as coarse sand or cloth, or both.

Figure 1 is a diagram of a centrifugal machine having a perforate basket, and Fig. 2 is a diagram of a centrifugal machine having an imperforate basket.

Referring first to Fig. 1, the slimes particles A are retained by the filtering-surface B, while the water is thrown out of the rotating basket into the outer vessel C.

In the case of the imperforate basket (illustrated in Fig. 2) the slimes particles A are thrown by centrifugal force through the water to the periphery of the basket D and accumulate there, while the excess of clean water E escapes over the return-lip D' of the drum or basket free from suspended particles. If necessary, a little lime may be added to the inflowing charge to assist deposition of the slime. When the basket is sufficiently charged with slime, from which the bulk of the water has been separated centrifugally, the inflowing stream of slime and water may be deflected to a second centrifugal machine to be charged during the emptying of the first machine. This procedure is continued until a sufficient layer of wet slimes has been accumulated in the basket, when the feed-flow is stopped, the rotation of the basket is discontinued, and the slimes accumulation is discharged for subsequent treatment by any known means. In the case of slimes such as gold-ore slimes, whose values can be recovered by a solvent, the next stage in the treatment consists in freeing the still wet material from the residual water contained and displacing the last portions thereof by any desired leaching solvent in a second centrifugal machine. For this purpose the sides of the basket in the second centrifugal are perforated—*i. e.*, an open basket is used, which is fitted internally with any suitable filtering material, as illustrated in Fig. 1. The remaining water in the slimes collected in the first machine is now to a large extent thrown out through the filtering material and the perforations of the basket. Even after this second centrifugal separation the slimes will still contain from ten to thirty per cent. of moisture, which would unduly dilute any solvent liquor applied to the slimes for extraction purposes in a series of operations. In order to expel this, a volume of leaching solution calculated to be equal in amount to the moisture still present is introduced into the rotating basket when this contains a full charge of drained material. In the case of auriferous slimes the solvent would preferably be a weak solution of potassium cyanid or other gold solvent which will not attack the material composing the centrifugal machine. This solution enters the drained slime layer and pushes the moisture out in front of it through the filter by virtue of the centrifugal force imparted to it. The basket is then stopped and the slimes, wet only with solvent liquor of normal strength and free from original milling moisture, are removed into any other plant which may be suitable to continue or complete the extraction—such, for example, as an agitating vessel—while the basket is left ready to treat a further charge of moist slimes. When the extraction of the slimes in such agitation or other apparatus is completed, the leaching solution is removed from the treated slimes in a similar manner—i. e., by charging the pulp of slimes and solution into a similar rotating centrifugal basket fitted for filtration. The bulk of solution is readily removed by centrifugal action through the filtering medium, carrying with it the dissolved ore values. The remaining solution, still amounting to from ten to thirty per cent. of the weight of the dry slimes, is now displaced centrifugally by the addition of an equal amount of water and added to the previously-separated bulk of the solution, from which the valuable contents may be separated by precipitation in the usual way. Practically complete displacement of the remainder of the solution follows, while the exhausted ore-slimes remain moist with water only and are discharged to the dump. If desired, the first or "collecting" centrifugal can also be fitted with a combined "closed" and "open" basket, by which the slimes collected while the sides of the basket are closed can be drained by throwing open the perforations behind the filtering medium, and the remaining adherent moisture in the drained slimes may be displaced by leaching solution before removal from the first basket. In many cases it will, however, be found preferable to use the first basket (with closed sides) entirely for collection and to reserve separate filtration centrifugal baskets for the succeeding draining and displacement operations.

In the case of ore-slimes in which the values, whether gold or other metal or compound, are capable of quick extraction by suitable solvent the leaching process in a separate plant is dispensed with and the values may be recovered in the second centrifugal by the passage through them of a sufficient amount of leaching solution applied continuously during the rotation period.

It is obvious that preliminary chemical treatment of the slimes may be given, if desired—such as, for example, alkaline washes in the case of some auriferous slimes—by slight modifications of the above-described treatment and that they may be replaced by water or solvent in the manner herein described.

In the case of some dry-crushed and dry-separated slimes it may only be necessary to treat them direct by the solvent in the before-mentioned dissolving-tank, thus avoiding the necessity of the first centrifugal machine for separating the water.

What we claim as our invention, and desire to secure by Letters Patent, is—

The process of treating ore-slimes which consists in separating by means of a centrifugal machine the ore-slimes from the residual water with which they are mixed by adding a little lime to the charge, removing the bulk of the water, thereafter introducing into the machine an amount of leaching solution of a volume equal to that of the remaining quantity of adhering moisture and introduced into the slimes by centrifugal action, and replacing the moisture by the added leaching solution.

In testimony whereof we have signed our names to this specification in the presence of two subscribing witnesses.

HENRY LIVINGSTONE SULMAN.
HUGH FITZALIS KIRKPATRICK-PICARD.

Witnesses:
CLAUDE MCKENZIE,
G. F. WARREN.